INVENTORS
WILLIAM C. COATS
EDWARD J. MOYER

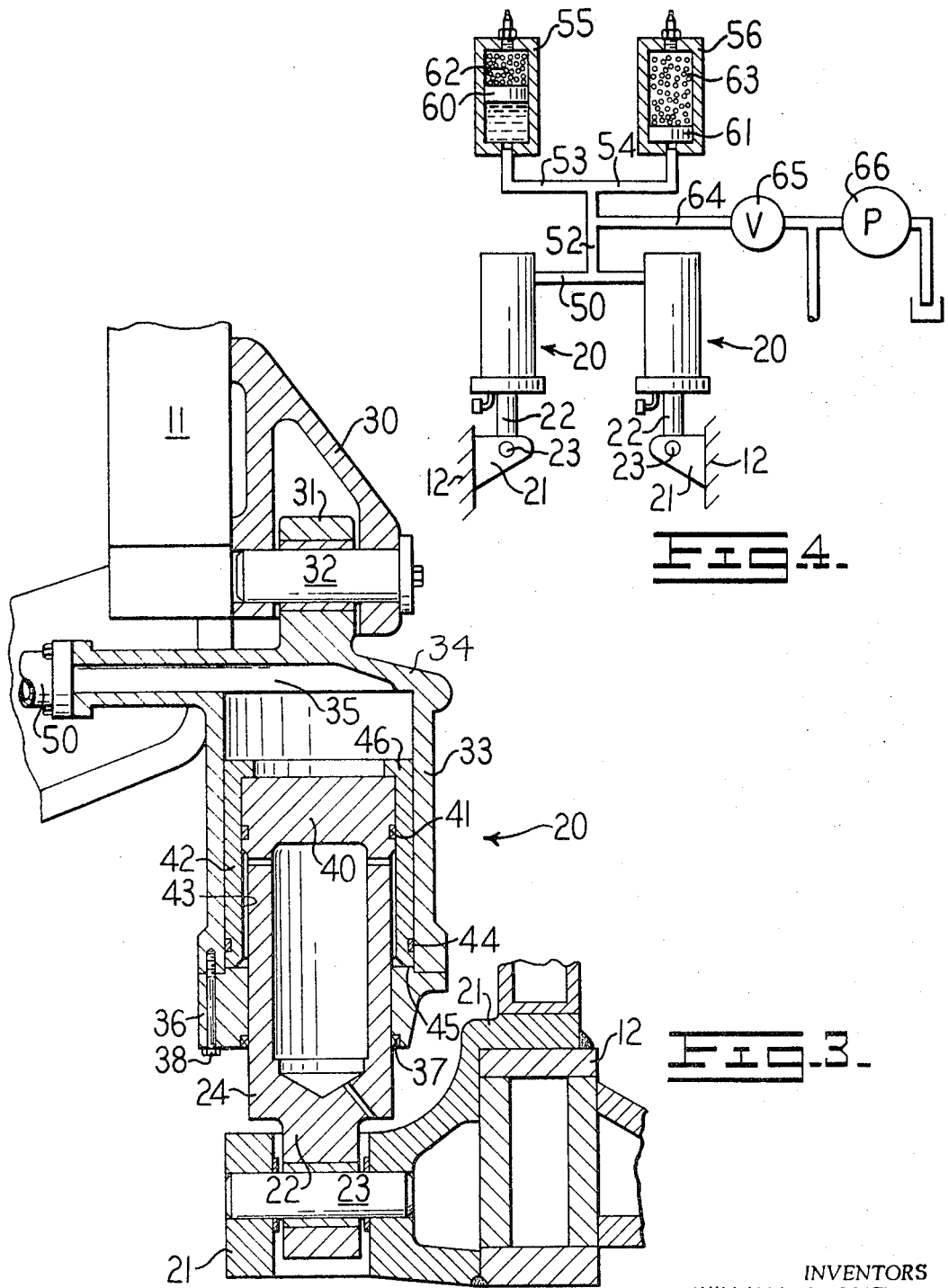

United States Patent Office 3,464,511
Patented Sept. 2, 1969

3,464,511
HYDROPNEUMATIC SUSPENSION SYSTEM
William C. Coats, Chillicothe, and Edward J. Moyer,
Morton, Ill., assignors to Caterpillar Tractor Co.,
Peoria, Ill., a corporation of California
Filed Oct. 17, 1967, Ser. No. 675,871
Int. Cl. B62d 55/00, 55/30
U.S. Cl. 180—9.54
2 Claims

ABSTRACT OF THE DISCLOSURE

A hydropneumatic suspension system for track-type tractors wherein the forward end of the tractor is supported by a pair of hydraulic jacks in fluid communication with each other and a hydropneumatic accumulator in a system which includes means for providing a dual rate action for the suspension, such jacks having a variable piston area which restricts oscillation when the tractor is operating laterally across the side of a hill or incline.

Background of the invention

The present invention relates to track-type tractors and more particularly to those designed to operate at high speed. In a conventional track-type tractor the engine and transmission are mounted on a main frame, while the tracks are mounted on a pair of spaced longitudinally extending track frames pivotally mounted on opposite sides of the vehicle and carrying sprockets for driving the tracks of the tractor. The rear of the track frames are pivotally mounted coaxial with the main drive shaft while the front end of the track frames are supported from the main frame by means of a cushioning suspension system.

While track-type tractors are preferred in many operations for their great tractive ability, as well as their increased floatation, they have the disadvantage of being limited to relatively low speeds. This speed limitation is partly the result of the front suspension system and the non-resilient pivoted mounting of the track frames on the rear of the tractor's main frame. When the tractor is operated at a high speed, the shock loads caused by uneven surfaces may be excessive, resulting in equipment failure with conventional systems. Further, the disruption of the operator can reach the level where it may be impossible for the operator to control the vehicle due to the sudden and irregular movements of the tractor at higher speeds.

Summary of the invention

The present invention solves the above problems by providing a track-type with a hydropneumatic system for suspending the front of the main frame from the track frame which is connected to an accumulator system that provides a variable spring rate. Thus, for small shock loads the rate is relatively soft, while as the load increases, the resistance in the accumulator also increases and thus increases the spring rate of the system.

Thus, the suspension system also incorporates means for restricting oscillation of the truck frames to increase stability when the tractor is operating laterally across the side of a hill or slope by provinding hydraulic jacks having two pistons of different areas, as for example, inner and outer pistons of different diameters and strokes within a single cylinder whereby different loading on the track frames can be accomplished. In such a system, with the rod extended past a certain point, the outer piston will engage a stop and only the inner piston will be moved which will decrease the piston area and create a differential piston area between the jack on the one side of the tractor in relation to the jack on the opposite side.

Brief description of the invention

The above advantages of this invention will be more easily understood from the following description of a preferred embodiment when taken in conjunction with the attached drawings in which:

FIG. 3 is a vertical section of one hydraulic jack and mounting means of the suspension system shown in FIG. 1; and FIG. 4 is a schematic diagram of the hydraulic jacks and accumulator used in the suspension system.

Figure 1:
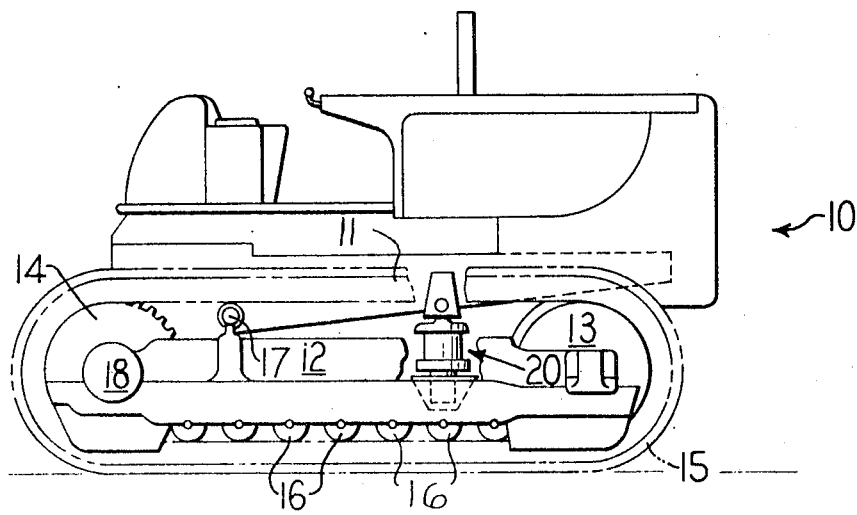
FIG. 1 is an elevation of the tractor having a suspension system constructed according to this invention.
Figure 2:
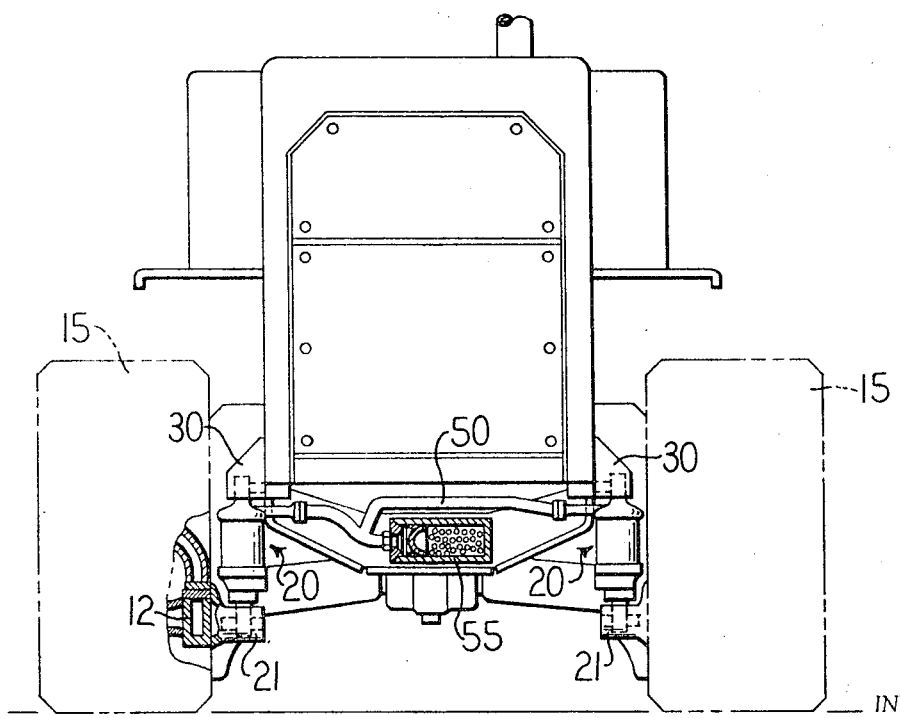
FIG. 2 is a front view of the tractor shown in FIG. 1.

Referring now to FIGS. 1 and 2 a track-type tractor having a main frame 11 with the engine and power transmission being mounted thereon is shown. The tractor is provided with a pair of track frames 12 that support an idler 13 at their forward ends and drive sprockets 14 at their opposite ends. Positioned on opposite sides of the tractor these two track frames extend longitudinally along the sides of the tractor and have endless tracks 15 pass around the idler and the drive sprocket. Track rollers 16 are provided along the lower side of the track frame to insure that the track supports the frame along the ground. Similar support rollers 17 are disposed along the top of the track frame to support the weight of the tracks. The main frame of the tractor and the track frames are pivotally coupled at the rear of the tractor by bearing means 18 disposed coaxially with the main drive shaft that drives the sprocket wheels 14.

According to this invention the forward end of the main frame is supported on the track frame by means of a pair of special hydraulic jacks 20. The mounting of each hydraulic jack is best illustrated in FIG. 3 showing the end of the piston rod 24 terminating in an eye 22 that is pivotally connected by means of a pin 23 to a cantilevered track frame support 21. The track frame support is rigidly secured to the track frame 12 by suitable means, such as welding.

The outer cylinder 33 of each hydraulic jack terminates in a closed end 34 which has a connecting element 31 extending axially therefrom which is pivotally connected to a cantilever support 30 by means of a pin 32. This support is rigidly attached to the main frame of the tractor by suitable means, such as welding. The axis of each pivot connections is transverse the machine's longitudinal axis so that the main frame is stabilized on the track frames.

As can be seen in FIGS. 1 and 2 one of the special jacks 20 is connected between the tractor frame and the track frame on each side of the tractor at the forward end of the machine and replaces the conventional system of links, springs, equalizers and the like. Since the track frames are independently suspended by the vertical jack at each side, it increases ground clearance under the middle of the tractor and allows independent oscillation of each track frame about its bearing connection to the tractor.

Through the above arrangement the dependency of track frame movement on opposite sides of the tractor is achieved solely through fluid flow in the hydropneumatic suspension system, including the special jack construction.

A fluid outlet 35 is provided in the closed end of each cylinder, through which they are connected to a common accumulator system through conduits. The piston rod of each jack extends from the lower end of its cylinder through end cap 36 secured to its cylinder by a plurality of bolts 38. A suitable hydraulic packing or seal 37 is disposed in a circular recess in each end cap to prevent loss of fluid around its piston rod. The support portion of the piston rod is specially constructed with two concentric telescopic piston units, an inner piston 40 being integrally formed with a rod and having a peripheral hydraulic seal or piston ring 41, and a free or outer piston 42 with a bore 43 which forms the cylinder for the inner piston when concentrically assembled thereon. The outer piston which is received in the cylinder bore has a hydraulic seal or piston ring 44 disposed in a circular groove adjacent its lower end. It is necessary that the outer piston has an overall length that is less than the bore length of the hydraulic cylinder 33 and arranged so that its lower end 45 will engage the inner surface of the end cap of the cylinder, as shown in the drawing, after a limited degree of travel of the rod.

The upper end of the free piston is preferably provided with an inwardly projecting radial flange or lip 46 that projects over the top of the inner piston, so the inner piston will carry the outer piston with it after engagement with the lip. Thus, the piston rod has a reduced effective piston area after a certain amount of extension.

When the above-described hydraulic cylinder is extended by fluid pressure, the inner piston will be capable of a greater outward travel with respect to the outer piston, after the outer piston has bottomed on its stops and becomes stationary. Also, if the inner piston is being forced downward by the fluid pressure it will travel at a greater rate after the outer piston stops as a result of its smaller area and increases the piston rod extension distance. This unequal piston area in the mechanism of the two hydraulic jacks after a certain degree of extension of one of them will tend to restrict oscillation of the two tracks when the tractor operates along a side of a hill.

Referring now to FIG. 4, the hydraulic connections between the jacks and the accumulator system are shown. More particularly, the two hydraulic jacks are in common fluid communication by means of connection to a conduit 50. This conduit is also coupled to the two accumulators 55 and 56 by means of conduits 52, 53, and 54. The accumulator 55 is provided with a free piston 60 having a compressed gas 62 disposed on the side of the free piston opposite the hydraulic fluid. In a similar manner the accumulator 56 is provided with a free piston 61 having a compressed gas 63 disposed on one side. In order to replenish the hydraulic supply of the suspension system conduit 64, having a valve 65 disposed therein, couples the system to the main hydraulic pump 66 of the tractor. Thus, when the hydraulic level in the system falls the valve 65 may be operated to replenish the hydraulic supply.

The two accumulators 55 and 56 are charged to different gas pressures to provide a dual spring rate. If accumulator 56 is charged to a higher pressure than accumulator 55 its free piston will compress the gas therein under shock loads until it equals the pressure loading in accumulator 56 at which time the free piston in accumulator 56 will move to cushion the shock. This produces a dual rate spring action for the system.

Operation

When a tractor having the above-described suspension system is operated on a relative level surface, the hydraulic jacks will react through the accumulator system as either track strike ground irregularities. This will provide a shock-absorbing action and allows the tractor to operate at higher speeds safely. When the front of the tracks fall in a depression, the hydraulic jacks will be extended by accumulator pressure and if the depression is deep, the smaller piston areas in each jack will be employed to give fast and increased extension of the rods. Alternatively, if a hydraulic jack is compressed, it will displace fluid from its hydraulic cylinder. Usually in such a case a part of the displaced fluid will displace one or both the free pistons in the accumulators, compressing the gas in the top of the accumulators while some of the displaced fluid will tend to extend the rod of the hydraulic jack on the opposite side of the tractor smoothing out the reaction of the tractor frame. This latter hydraulic jack may be extended a greater distance than the hydraulic jack being compressed if the front of the tractor pitches up as a result of the difference in effective piston area described above since, on compression the pistons in that jack, after a point will move upwardly together while in the other jack, only the smaller area inner piston is extending. This action will provide shock absorbing and will tend to keep both tracks in contact with the ground at higher speeds.

When one track falls in a depression, the hydraulic jacks generally will extend as the free pistons of the accumulators will move to supply fluid to the extending hydraulic jack along with some fluid from the opposite jack due to increased pressure to keep the tracks in contact with the ground.

If the tractor is operated along the side of a hill, the center of gravity of the tractor will move towards the downhill side, thus increasing the loading of the hydraulic jack on the downhill side. Due to the difference in area between the inner and outer pistons the downhill jack will support a larger portion of the weight without oscillation; thereby keeping the uphill track in contact with the ground. This increases the tractive ability and steerability of the tractor during lateral traverse.

While the suspension system has been described as using two accumulators, a single accumulator could also be used. A single accumulator, of course, would not supply the same dual rate spring action obtained through the use of two accumulators. Also, restrictors, check valves and the like can be incorporated with the accumulator system plumbing to achieve additional flexibility, response, etc.

We claim:

1. In combination with a track-type tractor having a pair of track frames with endless tracks, one of said track frames mounted on each side of said tractor being pivoted thereon to oscillate about the rear axle of said tractor on its associated side of said tractor, an improved hydropneumatic suspension system for connecting the front of said tractor with the forward portions of said track frames suitable for high speed operation comprising:

separate hydraulic jack means connected between the forward portions of said tractor and the forward portion of each of said track frames, each of said jack means including a differential piston means which increases its effective piston area as its associated frame moves toward said tractor and decreases its effective piston area as said frame moves away from said tractor when oscillating about its associated rear axle;

hydraulic conduit means connecting said separate hydraulic jack means in a common manifold; and two separate pneumatic accumulators, each having its hydraulic side commonly connected to said common manifold, one of which accumulators is charged to a greater pressure than the other whereby a hydropneumatic suspension system for the forward portions of said track frames is provided for high speed operation while maintaining a stiff, shock dampened suspension.

2. The combination as defined in claim 1 wherein a hydraulic charging system is connected to the common manifold through a valve.

References Cited

UNITED STATES PATENTS

| 2,139,178 | 12/1938 | Stevens | 280—104 |
| 2,312,389 | 3/1943 | Cordes | 180—9.5 X |
| 2,756,065 | 7/1956 | Schick | 180—9.52 |
| 3,063,510 | 11/1962 | Hunger | 180—9.2 |
| 3,189,116 | 6/1965 | Steffen | 180—9.5 |
| 3,353,815 | 11/1967 | Biabaud | 267—64 |

RICHARD J. JOHNSON, Primary Examiner